May 10, 1938.  E. H. WHITE  2,117,048
REMOTE CONTROL MECHANISM
Original Filed Sept. 24, 1930
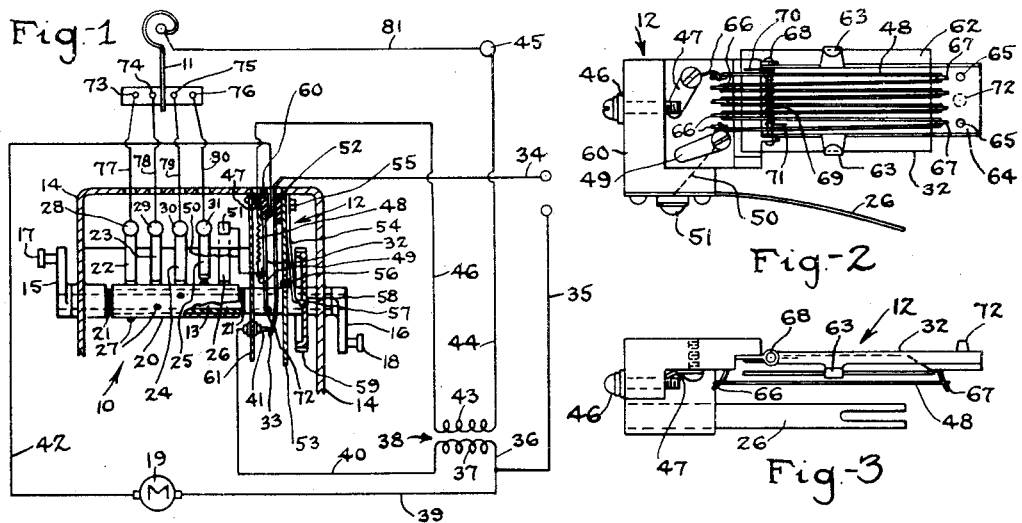
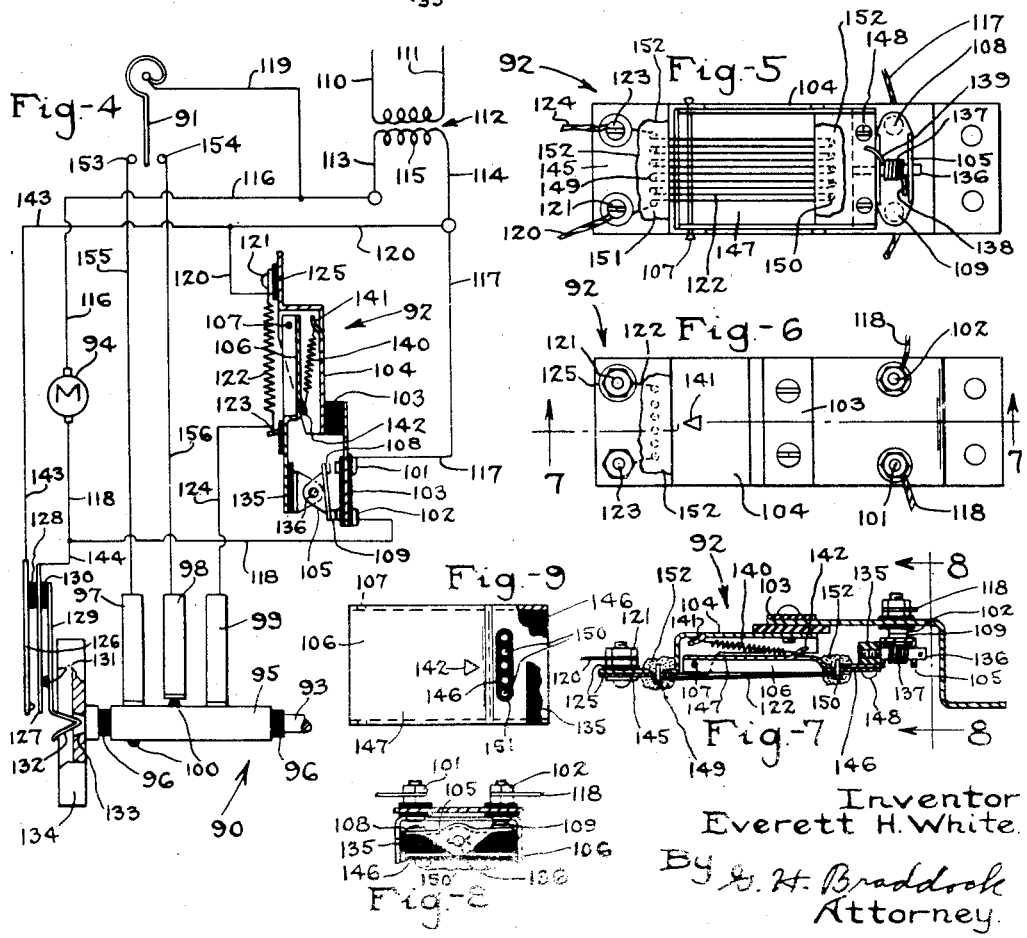
Inventor
Everett H. White.
By D. H. Braddock
Attorney.

Patented May 10, 1938

2,117,048

UNITED STATES PATENT OFFICE 2,117,048

REMOTE CONTROL MECHANISM

Everett H. White, St. Paul, Minn.

Original applications September 24, 1930, Serial No. 484,108, now Patent No. 2,004,622, and September 21, 1933, Serial No. 690,396, now Patent No. 2,077,294. Divided and this application May 13, 1935, Serial No. 21,218

4 Claims. (Cl. 200—113)

This application is a division of each of my two pending applications Serial No. 484,108, Patent No. 2,004,622 for Remote control regulator motor, filed September 24, 1930, and Serial No. 690,396, for Oil burner control, filed September 21, 1933 Patent No. 2,077,294.

The invention relates to mechanism for remotely controlling devices which require motive power to effect their operation, as, for example, heating plant dampers; steam, water, oil, or gas valves; circulating fans or blowers; and intake and mixing valves.

Mechanism for the remote control of devices operated by motive power have heretofore sometimes included electro-magnets as the actuating means for the regulator motor switches, and sometimes included heating elements for this same purpose. In each case where such a mechanism has employed an electro-magnet for actuating a regulator motor switch, the electro-magnet circuit has of necessity carried an inductive operating current of sufficiently large magnitude to cause arcing and to thus in time pit the more delicate types of switch elements, such as thermostatic switches or devices, controlling said electro-magnet circuit. In each case where such a mechanism has employed a heating element for actuating a regulator motor switch, a resistance has been used to supply heat to an expansible element, such as a thermostatic or bimetallic blade, or a chemically charged diaphragm, in the regulator motor circuit, with a consequent objectionable slowness of action of the regulator motor switch due to the fact that the electrical current has had to be applied to said resistance and the resultant heat transferred from the resistance to the expansible element by absorption.

An object of the invention is to provide an electrically operated mechanism for the remote control of a device operated by motive power, which will include a thermal starting switch of novel and improved construction for the regulator motor controlling said device.

Another object is to provide a non-inductive thermal starting switch for the regulator motor of a device to be remotely controlled, which thermal starting switch can be operated by an electrical current of insufficient capacity to cause arcing tending to pit or otherwise mar instruments, such, for example, as thermostatic elements or switches, incorporating delicate and fine electrical contacts and included in an electrical circuit controlling said thermal starting switch.

And yet another object is to provide a thermal starting switch for the regulator motor of a device to be remotely controlled, which thermal starting switch will be directly responsive in its operation to expanding and contracting actions of a resistance element of said thermal starting switch, whereby to eliminate necessity for transfer of heat by absorption to the starting switch as heretofore required in mechanisms employing heating elements for actuating motor switches.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a diagrammatic view disclosing a wiring system for a remote control mechanism made according to the invention;

Fig. 2 is an elevational view of the thermal starting switch of the regulator motor of the remote control mechanism of Fig. 1;

Fig. 3 is an edge view of the thermal starting switch as seen from above in Fig. 2;

Fig. 4 is a diagrammatic view of a wiring system for a remote control mechanism of modified construction including the features of the invention;

Fig. 5 is an elevational view of a modified type of thermal starting switch included in the regulator motor of the remote control mechanism of Fig. 4;

Fig. 6 is an elevational view of the thermal starting switch of Fig. 5, as seen from the side opposite that shown in said Fig. 5;

Fig. 7 is a sectional view taken on line 7—7 in Fig. 6;

Fig. 8 is a sectional view taken as on line 8—8 in Fig. 7; and

Fig. 9 is a plan view of the movable blade of the thermal starting switch of Figs. 5 to 8, showing said blade partially sectioned and partially broken away.

The proposition of employing an expansible and contractible resistance element; that is, a wire; in a remote circuit for the control of a device requiring motive power to effect its operation is fraught with difficulties when the remote circuit includes fine and delicate contacts. A relatively short resistance wire of length to be employed to control an electric switch of suitable and practical size to go into a remote control mechanism of practical and commercial proportions must of course be of cross-sectional area and strength to withstand the work required of an expansible and contractible resistance element functioning as the control of an electric switch, and must in use be expanded and contracted a considerable amount to properly and satisfactorily control the movable contact element of an electric switch. That is, said movable contact element must have a sufficiently long throw to cause it to be suitably spaced from the fixed contact element of an electric switch when in open position. A relatively short length of wire, or relatively short, separate lengths of wire, may, when of sufficient cross-sectional area to do the work, constitute an expansible and contractible resistance element for controlling an electric switch, which switch in turn controls a circuit including a motor for operating a device requiring motive power to effect its operation, but such a resistance element is unsuitable for use in a circuit including fine and delicate contacts. The amount of electrical power, or volts times amperes, or roughly, watts, permitted to pass through a circuit including fine and delicate contacts must be of quite limited, not too high, capacity, if pitting of said contacts, due to arcing when the contacts engage each other and disengage, is to be prevented. The circuit must also, at the same time, have potential or voltage of sufficiently great capacity to insure proper conductivity of current through the contacts when these engage each other.

Assuming a circuit, or, more specifically, assuming a circuit including fine and delicate contacts which are not to be pitted by arcing at the contacts and also including an expansible and contractible resistance wire, to be impressed with a fixed and suitable amount of electrical power, or volts times amperes, or watts, the relative electrical values in said circuit, expressed in volts, amperes and resistance, are natural values. That is, with increase of resistance in said resistance wire, the voltage in the circuit increases and the amperage decreases, and with decrease of resistance in the resistance wire, the voltage decreases and the amperage increases.

It has been found that an expansible and contractible resistance wire or element under a certain, comparatively great, length and of sufficient cross-sectional area to be strong enough to manipulate an electric switch, does not possess sufficient electrical resistance for satisfactory use in a circuit having fine and delicate contacts and impressed with an amount of electrical power of insufficient capacity to pit, burn, or mar said contacts. The relative electrical values in such a circuit as just mentioned, including a resistance wire or element of relatively short length, resolve themselves naturally so that the operating voltage in the circuit is entirely too low for suitable and commercial operation of the remote control mechanism. To increase the wattage, or volts times amperes, is to pit, burn, or mar the contacts, and to increase the cross-sectional area of the resistance wire is to decrease the resistance and still further lower the voltage. In short, to provide a workable arrangement, for a circuit having fine and delicate contacts, a resistance wire or element of comparatively great length, sufficient to obtain sufficiently great and proper resistance for operation at practical voltage, must be employed. Or, stated differently, in order to keep the wattage, or volts times amperes, in a remote control circuit including fine and delicate contacts at low enough value to effectively avoid pitting, burning or marring of the contacts, resistance wire of a comparatively great length is required. In practice, the comparatively great length of expansible and contractible resistance wire necessary to be utilized in any instance is, at least ordinarily, too long to stretch out in a single length when employed in an electric switch of suitable size to go into a remote control mechanism of commercial proportions, but by looping the resistance wire, in the manner as will be hereinafter set forth, said wire can be confined to a degree where it is conveniently and practicably usable in the electric switch of any commercial remote control mechanism.

A broader aspect of the invention is, then, to provide, in a remote circuit having fine and delicate contacts, a resistance wire or element of sufficiently great length to obtain proper resistance in the circuit for operation at practical voltage to avoid pitting, burning or marring of said contacts, it having been discovered that a resistance wire or element in a circuit including fine and delicate contacts is required to have especial characteristics, while a more specific aspect of the invention is to provide a thermal starting switch which will include a resistance wire or element of comparatively great length associated with the thermal starting switch in novel and improved manner to render the switch commercially usable.

With respect to Figs. 1 to 3 of the drawing and the numerals of reference thereon, 10 represents a regulator motor which may be applied to regulate any device requiring motive power to effect its operation, as, for example, heating plant dampers, valves controlling flow of steam, water, oil, gas, or other fluids; circulating fans or blowers; and intake and mixing valves.

An ordinary thermostatic element 11, in remote relation to the regulator motor 10 and the device to be regulated, is shown as a means for actuating a thermal starting switch 12 for said regulator motor, but, as will become obvious, different actuating means, such as mechanically propelled elements, for the thermal starting switch can be substituted for the thermostatic element illustrated.

The regulator motor 10 includes a driven or actuating shaft 13, which is suitably mounted in a casing 14 for the regulator motor, carrying crank arms 15 and 16 at its opposite ends and disposed outside of the casing 14, said crank arms 15 and 16 desirably extending in straight-angle relation to each other. Each arm 15 and 16 carries an outwardly extending headed pin, denoted 17 and 18, respectively, the pins 17 and 18 being adapted for convenient attachment to a device to be regulated.

It might be stated by way of example that when the crank arms 15 and 16 are in one of their positions, one element of a device to be controlled, say a draft damper of a furnace, could be completely closed, as by gravity, and another element of said device, say a check damper of the furnace, could be held wide open. When the positions of the crank arms are reversed, the first mentioned element could be held wide open and the second mentioned element could be completely closed, as by gravity. When the crank arms 15 and 16 are disposed between their extreme positions as set forth, both of the elements of the device to be controlled, a furnace as stated, could be held partially open to extents depending upon the actual positions of the crank arms, as will be evident.

It is the function of the thermostatic element 11, or other remote actuating means (not shown), to close an electrical circuit controlling the thermal starting switch 12, which switch in turn closes a circuit including the regulator motor 10 to cause said regulator motor to be operated in response to the closing of the electrical circuit controlling said thermal starting switch 12, to situate the driven or actuating shaft 13 in one of the several positions the crank arms 15 and 16 are intended to assume.

An electric motor 19 is drivingly connected by reducing gearing (not shown) to the driven or actuating shaft 13, and said shaft 13 carries a circuit breaker drum 20 which is suitably insulated from the shaft as indicated at 21. A circuit breaker consists of a number of conducting clips 22, 23, 24, 25, and 26, and the conducting clips 22, 23, 24, and 25 are raised and lowered, as the drum rotates, by small insulating buttons 27 upon the circuit breaker drum, there being at least one insulating button 27 for each clip 22, 23, 24, and 25. Said clips 22, 23, 24, and 25 are connected to terminals 28, 29, 30, and 31, respectively.

A motor switch consists essentially of two blades, designated 32 and 33, the blade 32, together with other elements to be described, constituting the thermal starting switch 12. Incoming wires 34 and 35 lead to the motor. As shown, the wire 34 is connected to the motor switch blade 33 while the wire 35 is connected to a wire 36 leading to one side of the primary 37 of a transformer 38 and to a wire 39 leading to one side of the motor 19. The other side of the primary 37 is connected by a wire 40 to a stationary contact 41 for the blade 33, and the other side of the motor 19 is connected by a wire 42 with the blade 32 of the motor switch.

One side of the secondary 43 of the transformer 38 is connected by a lead wire 44 with a terminal 45, while the other side of said secondary is connected by a lead wire 46 with one terminal 47 of a resistor 48 of the thermal starting switch 12 and supported upon the motor switch blade 32. The terminal 49 of the resistor 48 opposite the lead wire 46 is connected by means of a lead wire 50 with a terminal 51 for the conducting clip 26. The blade 33 is insulatively attached as at 52 upon a support 53 in the casing 14. A resilient finger 54 attached to said support at 55 carries an insulating protuberance 56 movable in an opening through said support 53, and said finger also carries a projection 57 ridable in slots or openings 58 in a gear 59 fixed to the driven or actuating shaft 13 and driven by the motor 19 through the reducing gearing.

When the electric motor 19 is at rest, the blades 32 and 33 are positioned as in Fig. 1. The arrangement is such that whenever current flows in the resistor 48, the blade 32 moves to the right in said Fig. 1 and makes contact with the blade 33. Said blade 33 is operated by the gear 59. The slots or openings 58, which are placed in said gear 59 at proper intervals, allow the resilient blade 33 to move to the right in Fig. 1, as said slots or openings 58 pass under the projection 57. At other times, said projection 57 rides on the face of the gear 59 to cause the blade 33 to engage the blade 32 but to be flexed or bent about a contact 72 at the lower end of said blade 32 to remove the lower portion of said blade 33 from the stationary contact 41 and thus break electrical engagement between the blade 33 and said stationary contact.

The resistor 48 desirably consists of a single strand of suitable wire of relatively fine dimension having its end portions attached to the terminals 47 and 49, respectively, mounted upon an insulating block 60 itself conveniently carried in the casing 14, adjacent the blade 33, upon a support 61 in spaced relation to the support 53. The support 61 may also carry the stationary contact 41. The intermediate portion of the wire strand resistor 48 extends back and forth across the outer face of a mica sheet 62 conveniently fixed, as at 63, to the face of the blade 32 opposite the blade 33, and outer parts of said intermediate portion of the wire strand, in spaced relation to the terminals 47 and 49, are rigidly attached to a small insulating block 64 itself suitably fastened, as at 65, to the outer free end portion of the blade 32, against the face thereof opposite the blade 33. More specifically, the insulating block 60 supports a series of alining, spaced apart metallic lugs or posts 66, and the insulating block 64 supports a similar series desirably including an equal number or alining, spaced apart metallic lugs or posts 67, about all of which lugs or posts 66 and 67 the wire strand is successively wound. In the manufacture of the thermal starting switch 12, an end of the wire strand resistor 48 thereof may be first attached to a terminal 47 or 49, an adjacent portion of said wire strand may then be wound one or more times about an outermost lug or post 66, then the next adjacent portion of the wire strand may be wound about an outermost lug or post 67, then about the lug or post 66 next adjacent one already wired, then about the lug or post 67 next adjacent one already wired, and so on, until the lugs or posts are all wired, and finally the wire strand may be attached to the other terminal 49 or 47.

The blade 32 is conveniently pivoted to the insulating block 60, as by a small shaft 68 which passes through ears upon said blade 32 and said insulating block 60, and a coil spring 69 upon the small shaft 68 includes a projecting end 70 in engagement with the insulating block 60 and a projecting end 71 in engagement with the blade 32, the function of said coil spring and its projecting ends 70 and 71 being to urge said blade 32 to swing on its axis toward the blade 33, whereby the contact 72 of the blade 32 can engage the blade 33. Each length of the wire strand resistor 48 is taut or tensioned between the lugs or posts 66 and 67 to normally hold the blade 32, against the action of the coil spring 69, out of engagement with the blade 33, and so that said blade 32 and the insulating block 64 thereon will desirably be in approximate alinement with the insulating block 60, and the wire strand resistor 48, evidently non-inductive, is composed of material having a coefficient of expansion sufficiently great to cause immediate lengthening of said wire strand resistor to an extent to allow the contact 72 to engage the blade 33 immediately when only a very small charge of electricity is applied to said resistor in a manner to be explained. In practice, application to said resistor of four watts, or even less, of operating current is quite sufficient to cause engagement between the blades 32 and 33.

The regulator motor operates in the manner as follows. As shown in Fig. 1, said regulator motor is in an inoperative position indicated by the conductor clip 25 which is separated from the circuit breaker drum 20 by an insulating button 27. When connection is now made from the terminal 45 to any one of the terminals 28, 29, or 30, the secondary circuit of the transformer is closed through the resistor 48, which allows the blade 32 to move to the right, in the manner as set forth, and make contact with the blade 33 at 72. This closes the circuit to the electric motor 19, which sets the gear 59 and the circuit breaker drum 20 in motion. The circuit through the resistor 48 is from the secondary 43 of the transformer through the lead wire 46 to said resistor, from the resistor by lead wire 50 to the conductor clip 26 through the terminal 51, through the circuit breaker drum 20 and to the terminal 45 by the particular connection made, and back to the secondary 43 through lead wire 44. The motor circuit is from lead wire 34 to the blade 33, to contact 72 and blade 32, through lead wire 42 to the motor 19, and by lead wire 39 to lead wire 35. As soon as the gear 59 starts to rotate, it causes the projection 57 upon the finger 54 to ride up out of the corresponding slot or opening 58 and force the blade 33 to the left in Fig. 1, to hold engagement between the blades 32 and 33 and break engagement between the blade 33 and the stationary contact 41. The breaking of engagement between the blade 33 and the stationary contact 41 opens the primary side of the transformer and cuts the current off of the resistor 48, as will be apparent. The electric motor operates until the projection 57 drops into the next slot of opening 58 in the gear 59. The control motor will then stop if it is in the position called for by the particular connection made between the terminal 45 and one of the terminals 28, 29, or 30. If the regulator motor is not in such position, the cycle will be repeated. That is to say, if the terminal 45 is connected to the terminal 29, for example, the motor will operate until the clip 23 is raised by an insulating button on the circuit breaker drum 20. The driven or actuating shaft 13 will remain in the position at which thus set by the motor until connection is made between said terminal 45 and one of the other terminals 28, 30 or 31.

The thermostatic element 11, which is a bimetallic blade, includes a lower portion adapted to wipe over spaced apart terminals, designated 73, 74, 75, and 76. Lead wires 77, 78, 79, and 80 connect the terminals 28 and 73, 29 and 74, 30 and 75, and 31 and 76, respectively. The terminal 45 is connected to the bimetallic element 11 by a lead wire 81.

In Fig. 1 the conductor clip 25 is shown resting upon its corresponding insulating button 27, the crank arm 15 extends vertically upward, and the crank arm 16 extends vertically downward. Let it be supposed that this arrangement allows the draft damper of a furnace to be completely closed and causes the check damper of said furnace to be wide open. To cause the regulator motor to assume the position as just recited, the bimetallic blade had to contact with the terminal 76, and after said blade 11 and said terminal 76 engaged each other, the regulator motor remained in this position called for by the thermostat 11, unless and until said thermostat engaged one of the other terminals 73, 74, or 75. When said thermostat 11 engages one of said other terminals, electric connection is made between the terminal 45 and a terminal 28, 29, or 30, as the case may be. Supposing that with the regulator motor positioned as in Fig. 1, the bimetallic blade 11 next engages the terminal 73, electric connection is made from the terminal 45 to the terminal 28 through the lead wire 81, the blade 11, said terminal 73, and the lead wire 77. Such connection causes the regulator motor to advance and to stop, in the manner as already set forth, when the conductor clip 22 rides its corresponding insulating button 27. As disclosed, the insulating button 27 which is beneath the conductor clip 22 is disposed upon the circuit breaker drum 20 at location diametrically opposite the insulating button 27 beneath the conductor clip 25, so that when the shaft 13 stops at position where the corresponding insulating button 27 elevates the conductor clip 22 from the circuit breaker drum 20, the draft damper is held wide open and the check damper is completely closed by gravity. The regulator motor again remains stationary until the blade 11 contacts with one of the terminals 74, 75, or 76, and when the new contact is made, the regulator motor advances and stops at the corresponding position. As shown, there is a single insulating button for each of the conductor clips 22 and 25 and desirably two insulating buttons for each of the conducting clips 23 and 24, the insulating buttons for said conductor clip 23 desirably being set at about 70° from the insulating button for the conductor clip 22, at opposite sides thereof, and the insulating buttons for said conductor clip 24 desirably being set at about 70° from the insulating button for the conductor clip 25, at opposite sides thereof, so that insulating buttons for the conductor clips 23 and 24 and at the same side of the circuit breaker drum are desirably spaced about 40° apart. For each insulating button 27 there is a corresponding slot or opening 58 in the gear 59. The purpose of the pair of insulating buttons 27 for the conductor clips 23 and 24, respectively, will be obvious. The conductor clip 23 is for causing the regulator motor to be positioned to situate the crank arms in one of two positions either of which can cause both the draft and check damper of a furnace, for example, to be partially open. The conductor clip 24 is for causing the regulator motor to be positioned to situate the crank arms in one of two positions, different from the positions determined by the conductor clip 23, either of which can cause both said draft and check damper to be partially open to degree different from that determined by said conductor clip 23. The spacing of the insulating buttons 27 as illustrated and described can cause a draft damper and check damper of a furnace to be manipulated from open to closed and from closed to open position in equal step by step stages. That is, the arrangement disclosed can control draft and check dampers each capable of having four stationary positions, including a closed condition, a wide open condition, a two-thirds open condition, and a one-third open condition. It could of course be the function of a mechanically propelled element, substituted for the element 11, to successively make connection between the terminal 45 and each of terminals, such as 28, 29, 30, and 31, or a greater or a less number than four terminals, to cause an electric motor, such as 19, to be successively operated to advance the driven or actuating shaft 13 step by step and cause it to stop after advanced, and thus sequentially position manipulating elements, such as the crank arms 15 and 16, associated with said driven or actuating shaft 13 to successively situate operating elements of a mechanism to be controlled at locations necessary to the carrying out automatically of related steps in said mechanism to the performance of an intended function or result, as will be understood.

In any event, manipulating elements suitable to a particular purpose can be substituted for the crank arms 15 and 16, it being apparent that different types of devices, such as valves, blowers, etc., to be remotely controlled and requiring motive power to effect their operation, may have to be associated with the driven or actuating shaft, such as 13, of a regulator motor in a manner entirely different from that of associating a draft damper and a check damper with the driven or actuating shaft 13 as illustrated and described.

It will be appreciated that the employment of a thermal starting switch, such as 12, which is directly responsive in its operation to expanding and contracting action of a resistance element, such as 48, itself expanding and contracting immediately upon receiving flow of current, makes provision in the present electrically operated mechanism for efficient operation of a regulator motor circuit control switch practically instantaneously with the closing of the circuit controlling said thermal starting switch. Employment of the non-inductive resistance element 48, in the manner as fully set forth, allows operation of the thermal starting switch by means of a controlling circuit therefor which incorporates very fine and delicate contacts, for the reason that the operating current required by the resistance element to accomplish actuation of the thermal starting switch of the invention does not have to exceed four watts, which, flowing through a non-inductive circuit, causes practically no arcing whatever at controlling instrument contacts, such as those made between the terminals 73, 74, 75, and 76 and the bimetallic blade 11. The arrangement as herein illustrated and described is a great and valuable improvement over arrangements heretofore in vogue for such work as temperature regulation and humidity control, and the present general arrangement is also being found to be invaluable for a variety of other uses.

The resistance element or wire 48 will of course in each installation be of comparatively great length, sufficient to obtain proper resistance for operation at practical voltage and wattage, insuring that fine and delicate contacts in a circuit having said resistance element or wire will not become pitted, burned or marred because of arcing at said contacts, as hereinbefore fully set forth. The resistance wire employed obviously renders a thermal starting switch capable of being commercially used when the resistance wire is looped and assembled in the switch in the manner as illustrated and described.

Attention is called to the fact that by adding or subtracting circuit breaker clips and control and regulator circuit terminals, the number of stops of the regulator motor can be increased or decreased without necessity for material changes in the general mechanism.

In Figs. 4 to 9 of the drawing there is disclosed a modified type of remote control mechanism incorporating the features of the invention. With respect to said Figs. 4 to 9, numeral 90 represents a regulator motor for the same general purpose as the regulator motor 10 already described.

An ordinary thermostat 91, in remote relation to the regulator motor 90 and the device to be regulated, is for actuating a thermal starting switch 92 for said regulator motor 90.

The regulator motor 90 includes a driven or actuating shaft 93 which may be mounted in a casing (not shown) for the regulator motor, in about the manner as set forth in connection with the driven or actuating shaft 13. The driven or actuating shaft 93 may carry one or more crank arms (not shown) such as 15 and 16.

As stated in connection with the thermostatic element 11, the thermostatic element 91 closes an electrical circuit controlling the thermal starting switch 92, which switch 92 in turn closes a circuit including the regulator motor 90 to cause said regulator motor to be operated in response to the closing of the electrical circuit controlling said thermal starting switch 92, to situate the driven or actuating member 93 in one of several positions said driven or actuating member, or the crank arms thereon, is intended to assume. In the disclosure as made, the driven or actuating member 93 is adapted to assume but two positions, corresponding to the extreme positions in Fig. 1, but said driven or actuating member 93 in the present embodiment of the invention could assume additional positions, as stated in connection with said Fig. 1, by adding circuit breaker clips and control and regulator circuit terminals.

An electric motor 94 is drivingly connected by reducing gearing (not shown) to the driven or actuating shaft 93, and said shaft carries a circuit breaker drum 95 which is suitably insulated from the shaft as indicated at 96. A circuit breaker consists of a number of conducting clips 97, 98, and 99, and the conducting clips 97 and 98 are raised and lowered, as the drum rotates, by small insulating buttons 100 upon the circuit breaker drum 95.

A motor switch consists of a pair of screw contacts 101 and 102 insulatively assembled as at 103 with a base 104 suitably fixed in the casing for the regulator motor, and a double contact element 105 carried by a movable blade 106 pivotally supported upon the base 104 as at 107. The double contact element 105 includes spaced apart contactors 108 and 109 adapted to engage the screw contacts 101 and 102, respectively. The movable blade 106 is equivalent to the blade 32 of Figs. 1 to 3.

Incoming wires 110 and 111 lead to a transformer 112, and wires 113 and 114 lead from the secondary 115 of the transformer to the motor 94. As shown, the wire 113 is connected to a wire 116 leading to one side of the motor, and the wire 114 is connected to a wire 117 leading to the screw contact 101. A wire 118 leads from the screw contact 102 to the motor 94.

A lead wire 119 extends from the lead wire 116 to the thermostatic element 91, and a lead wire 120 extends from the lead wire 114 to one terminal 121 of a resistor 122 of the thermal starting switch 92 and supported upon the movable switch blade 106. The terminal 123 of the resistor 122 opposite the lead wire 120 is connected by means of a lead wire 124 with the conductor clip 99. The terminals 121 and 123 are insulatively attached to the base 104 as at 125.

The double contact element 105 with contactors 108 and 109 cooperates with the screw contacts 101 and 102, in a manner to be described, to provide a switch for closing a circuit through the electric motor 94. A second switch for closing a different circuit through said electric motor 94 includes a stationary contact element 126 and a movable contact element 127 insulated from each other as at 128, and insulatively mounted, as in the casing (not shown) for the regulator motor. A resilient finger 129, insulatively supported as at 130, upon or adjacent to the movable contact element 127, carries an insulating boss 131 adapted to engage said movable contact element 127, and said finger 129 also carries a projection 132 ridable in slots or openings 133 in a gear 134 fixed to the driven or actuating shaft 93 and driven by the motor 94 through the reducing gearing.

As disclosed, the movable blade 106 insulatively supports, as at 135, a shaft 136 extending longitudinally from the free end of said movable blade 106, and an intermediate portion of the double contact element 105 is rotatably mounted upon said shaft 136. The shaft carries a coil spring 137 one end 138 of which engages the double contact element 105 and the other end 139 of which engages an insulated part upon the movable blade 106 to hold the contactor 109 of said double contact element in engagement with the screw contact 102 and the contactor 108 of the double contact element out of engagement with the screw contact 101.

When the electric motor 94 is at rest, the movable blade 106 and the double contact element 105 pivoted thereon are positioned as in the drawing, with the elements 102 and 109 in engagement and the elements 101 and 108 separated. When current flows in the resistor 122, the movable blade moves to the right in Fig. 4 and the contactor 108 makes engagement with the screw contact 101. This action is caused by the tension of a coil spring 140 attached to the base 104 as at 141 and to the movable blade 106 as at 142. The current flowing in the resistor 122 causes this to lengthen, and the coil spring 140 acts against the tendency of the weaker coil spring 137 to cause said contactor 108 to engage said screw contact 101.

The movable contact element 127 is operated by the gear 134. The slots or openings 133, which are placed in said gear 134 at proper intervals, allow said movable contact element 127 to move to the right in Fig. 4, and away from the stationary contact element 126, as said slots or openings 133 pass under the projection 132. At other times, said projection 132 rides on the face of the gear 134 to cause the movable contact element 127 to engage the stationary contact element 126.

A lead wire 143 connects the lead wire 120 with the stationary contact element 126, and a lead wire 144 connects the movable contact element 127 with the lead wire 118.

The resistor 122 is a single strand of wire, of the same nature as the resistor 48, having its end portions attached to the terminals 121 and 123, respectively, which have been described hereinbefore as insulatively mounted upon the base 104. The intermediate portion of the wire strand resistor 122 extends back and forth over two mica sheets, denoted 145 and 146, respectively, as well as over the body of the movable blade 106. The mica sheet 145 is suitably secured to said base 104 and the mica sheet 146 is suitably secured to said movable blade 106. The body of the movable blade is offset, as at 147, to be separated from the parts of the wire strand resistor extending between the mica sheets. As disclosed, the terminals 121 and 123 secure the mica sheet 145 to the base 104, and screws 148 which attach the insulating block 135 to the movable blade 106 secure the mica sheet 146 to said movable blade. The mica sheet 145 supports a series of alining, spaced apart metallic lugs or posts 149, and the mica sheet 146 supports a similar series desirably including an equal number of alining, spaced apart metallic lugs or posts 150, about all of which lugs or posts 149 and 150 the wire strand is successively wound. The metal of the base 104 and of the movable blade 106 is cut away, as at 151, about the lugs or posts 149 and 150 to be clear thereof. In the manufacture of the thermal starting switch 92, an end of the wire strand resistor 122 thereof may be first attached to a terminal 121 or 123, an adjacent portion of said wire strand may then be wound one or more times about an outermost lug of post 149, then the next adjacent portion of the wire strand may be wound about an outermost lug or post 150, then about the lug or post 149 next adjacent one already wired, then about the lug or post 150 next adjacent one already wired, and so on, until the lugs or posts are all wired, and finally the wire strand may be attached to the other terminal 123 or 121. Preferably, after the wire strand is so assembled in the structure, insulating cement 152 is placed in the openings 151, as well as about the lugs or posts 149 and 150 at the faces of the mica sheets 145 and 146 opposite said openings 151. The insulating cement 152 evidently insures that the metallic lugs or posts will remain in fixed position.

The regulator motor 90 is in an inoperative position indicated by the conductor clip 98 which is separated from the circuit breaker drum 95 by an insulating button 100. When connection is now made from the lead wire 119 to the conductor clip 97, or to any conductor clip for the circuit breaker drum 95, a circuit is closed through the secondary 115 and the resistor 122, which allows the movable blade 106 to move to the right in Fig. 4, so that the contactor 108 engages the screw contact 101, in the manner as described. This closes a circuit through the electric motor 94, which sets the gear 134 and the circuit breaker drum 95 in motion. The circuit through the resistor 122 is from the secondary 115 of the transformer through the lead wires 114 and 120 to said resistor, from the resistor by lead wire 124 to the conductor clip 99, through the circuit breaker drum 95 and to the lead wire 119 by the particular connection made, as, for example, through the conductor clip 97, or some other conductor clip (not shown), and back to the secondary 115 through the lead wire 113. The motor circuit is from the secondary 115 through lead wires 114 and 117 to the screw contact 101, thence through the double contact element 105 and the contactors 108 and 109 thereof to the screw contact 102, thence through lead wire 118 to said motor 94, and back to the secondary through lead wires 116 and 113. As soon as the gear 134 starts to rotate, it causes the projection 132 upon the finger 129 to ride up out of the corresponding slot or opening 133 and force the movable contact element 127 into engagement with the stationary contact element 126, and hold the motor switch including said contact elements 126 and 127 closed. When the elements 126 and 127 are engaged, a circuit for the motor is from the secondary 115 through lead wires 114, 120 and 143 to the stationary contact element 126, thence through the movable contact element 127 and lead wires 144 and 118 to said motor 94, and thence back to said secondary 115 through lead wires 116 and 113. The electric motor will operate until the projection 132 drops into the next slot or opening 133 in the gear 134. The control motor will then stop if it is in position called for by the particular connection made between the conductor clip 99 and lead wire 119. If the regulator motor is not in such position, the cycle will be repeated. In the disclosure as made, including but two conductor clips 97 and 98, there is but one connection which can be made after the regulator motor has been in inoperative position. The above remarks assume a number of conductor clips, such as 97 and 98, greater than two to be employed. After any conductor clip, such as 97 or 98, is raised by its insulating button, such as 100, the driven or actuating shaft 93 will remain in the corresponding position until connection is made between line wire 119 and a conductor clip which is not held raised by its insulating button.

The thermostatic element 91, which is a bimetallic blade, includes a lower portion adapted to engage spaced apart terminals indicated 153 and 154. A lead wire 155 extends between the conductor clip 97 and the terminal 153, and a lead wire 156 extends between the conductor clip 98 and the terminal 154.

To cause the regulator motor 90 to assume its position as in Fig. 4, the bimetallic blade 91 had to contact with the terminal 154, and after said blade 91 and said terminal engaged each other, the regulator motor remained in this position called for by the thermostat 91, unless and until said thermostat engaged the terminal 153. When the thermostat engages the terminal 153, electric connection is made between the lead wire 119 and the conductor clip 97 through the blade 91, said terminal 153 and lead wire 155. Such connection causes the regulator motor to advance and to stop, in the manner as described, when the conductor clip 97 rides its corresponding insulating button 100. The insulating button beneath the conductor clip 97 is disposed upon the circuit breaker drum 95 at location diametrically opposite the insulating button beneath the conductor clip 98.

The contactors 108 and 109 of the double contact element 105 and the screw contacts 101 and 102 which said contactors 108 and 109, respectively, engage, are all adapted to be conductively connected in a circuit including the electric motor 94, as before set forth. Thus there may at times be tendency for the elements 101 and 108 to stick together, due to a certain amount of arcing at said elements caused by relatively heavy current in the electric motor circuit. In case there is such tendency toward sticking together of said elements 101 and 108 when the movable blade 106 swings away from the base 104, the contactor 109 of the double contact element 105 will, obviously, be easily and readily removed from the screw contact 102 to positively break the motor circuit through the screw contacts 101 and 102 and the double contact element 105, and a rocking action will as a result of the removal of said contactor 109 away from said screw contact 102 be imparted to said double contact element 105, which rocking action will cause the contactor 108 to have a rocking or rolling action tending to remove said contactor 108 from the screw contact 101, rather than a direct lifting action or movement as would be the case were the special type of double contact element 105 as illustrated and described not employed.

The portion of the present application relating to the resistor 48 of the thermal starting switch 12, etc., is derived from my application Serial No. 484,108, filed September 24, 1930, Patent No. 2,004,622, while the portion of the instant case relating to the double contact element 105, etc., is derived from my application Serial No. 690,396, filed September 21, 1933, Patent No. 2,077,294.

What is claimed is:

1. A thermal switch including a switch member to be actuated, a supporting member for said switch member, an expansible and contractible resistance element attached to said supporting member and said switch member, said resistance element comprising a continuous strand of material, spaced apart anchors carried by said supporting member, and spaced apart anchors carried by said switch member, said continuous strand of material including portions thereof engaged with said anchors carried by said supporting member and said switch member, respectively, and providing separate lengths of said strand arranged adjacent each other and each extending between an anchor upon said supporting member and an anchor upon said switch member, said switch member having potential for limited movement in one direction when the resistance element becomes expanded, and said resistance element having potential for imparting limited movement in opposite direction to said switch member when said resistance element becomes contracted.

2. A thermal switch including a switch member to be actuated, a supporting member for said switch member, an expansible and contractible resistance element attached to said supporting member and said switch member, said resistance element comprising a continuous strand of wire, a sheet of mica carried by said supporting member, a set of spaced apart anchors carried by said sheet of mica in spaced relation to said supporting member, a second sheet of mica carried by said switch member, a set of spaced apart anchors carried by said second sheet of mica in spaced relation to said switch member, said continuous strand of wire including portions thereof engaged with said anchors carried by said sheet of mica and said second sheet of mica, respectively, and providing spaced apart lengths of said strand arranged adjacent each other and each extending between an anchor carried by said sheet of mica and an anchor carried by said second sheet of mica, said switch member having potential for limited movement in one direction when the resistance element becomes expanded, and said resistance element having potential for imparting limited movement in opposite direction to said switch member when said resistance element become contracted, and insulating cement securing each set of anchors to the mica sheet by which carried, all of said anchors being embedded in insulating cement.

3. An electric switch comprising a pair of relatively movable entities, a pair of spaced apart, relatively fixed contact elements carried by one of said entities and insulated from each other, a contact member pivotally supported upon the other entity and having a contactor at either side of its pivotal support, said contact member being adapted to bridge said contact elements by engagement of each of said contactors with a different one of the contact elements, means resiliently holding one of said contactors in engagement with one of said contact elements and the other contactor in spaced relation to the other contact element, and means for actuating said entities toward and away from each other to cause said other contactor and said other contact element to become engaged and disengaged.

4. An electric switch comprising a stationary entity, a movable entity, a pair of spaced apart, relatively fixed contact elements carried by one of said entities and insulated from each other, a contact member pivotally supported upon the other entity and having a contactor at either side of its pivotal support, said contact member being adapted to bridge said contact elements by engagement of each of said contactors with a different one of the contact elements, means resiliently holding one of said contactors in engagement with one of said contact elements and the other contactor in spaced relation to the other contact element, and an expansible and contractible resistance element for actuating the movable entity, said movable entity having potential for movement to cause said other contactor and said other contact element to become engaged when said resistance element becomes expanded, and said resistance element having potential for imparting limited movement to said movable entity to cause said other contactor and said other contact element to become disengaged when said resistance element becomes contracted.

EVERETT H. WHITE.